Patented Apr. 3, 1951

2,547,432

UNITED STATES PATENT OFFICE 2,547,432

COATED WELDING ROD

William Andrews, Gateshead-on-Tyne, England, assignor to Metal and Thermit Corporation, New York, N. Y.

No Drawing. Application January 18, 1946, Serial No. 642,118. In Great Britain February 14, 1944

Section 1, Public Law 690, August 8, 1946
Patent expires February 14, 1964

16 Claims. (Cl. 148—26)

This invention relates to flux coated welding rods suitable for use in electric arc or gas welding operations for the welding of aluminum, copper, nickel or alloys thereof or nickel-chromium stainless steels, and has for its object the provision of an improved binding agent for use in the flux compositions applied to the surface of the welding rod.

Hitherto it has been customary to employ sodium silicate as binding agent in the flux composition, but difficulty has been experienced in obtaining thoroughly dried flux coatings with a sodium silicate binder, since the soluble silicates retain an appreciable quantity of water at any drying temperature up to the melting point of the silicate. The presence of the water in the flux coating is undesirable since it tends to react with the molten weld metal with the oxidation of readily oxidizable alloying ingredients such as titanium or zirconium, and with the liberation of free hydrogen which may be absorbed by weld metal.

I have now found that improved results can be obtained by including sodium or potassium aluminate as binding agent in the flux composition, and that the flux coatings so obtained can be dried effectively at temperatures below 650° C.

According to the present invention therefore a welding rod is provided with a flux coating comprising as binding agent sodium or potassium aluminate. The flux ingredient may be powdered mineral or other substances customarily used with a silicate binder. The flux coating may also contain metal powders such as are commonly used, e. g. chromium, nickel chrome, ferro-molybdenum, or ferro-titanium. Thus for example the aluminates may be used in conjunction with rutile, ilmenite or iron oxide base coatings for mild steel electrodes; they may be used for stainless steel electrode coatings in which calcium fluoride, carbonate or titanium oxide is the main constituent. They may also be employed in non-ferrous welding rods.

The sodium or potassium aluminates best suited for use according to this invention are those containing equi-molecular proportions of sodium oxide or potassium oxide and aluminum oxide, since these are not deliquescent. However the sodium and potassium aluminates commonly available in commerce contain a somewhat higher proportion of alkali and are deliquescent. Thus, for example, commercial sodium aluminate has a molecular ratio of sodium oxide to aluminum oxide of about 1.3 to 1.0, and is appreciably deliquescent. According to a further feature of our invention we employ an aluminate having a molecular ratio of base to alumina greater than 1:1, and we render it non-deliquescent by the addition of a sufficient proportion of an oxide of aluminum, titanium or zirconium, to combine with the excess base.

The flux coatings of the present invention may be applied by extrusion. We have found that their plasticity is greater than that of flux coatings made with conventional silicate binders, and consequently we have found that we can omit or reduce the proportion of substances such as kaolin, which have been added hitherto for the purpose of facilitating the extrusion. The flux compositions of the invention are slow setting when cold and consequently can be kept for a considerable time and still be extrudable. Air drying, which is frequently necessary with silicate pastes in order to prevent the cracking of the cating, is unnecessary and electrodes can be baked immediately after extrusion. The flux coatings may also be made up in more fluid form by the addition of water and may then be applied by a dipping operation.

The flux coatings of the present invention are particularly useful for non-ferrous electrodes such for example as those of nickel-, tin-, aluminum-bronze or the alloy known under the registered trade-mark "Monel." They may also be used for electrodes of stainless steel and mild steel, in which case it is possible by the use of fluoride fluxes in conjunction with the aluminate binder to use such easily extrudable substances as ferro-titanium in the coating to obtain an appreciable percentage of titanium in the weld metal. The invention also renders it possible to use constituents, for example, silico-fluorides, the use of which is impossible with silicate binders by reason of their chemical reaction therewith.

The invention is illustrated but not limited by the following examples.

Example 1

A paste-like coating composition was prepared by mixing the following ingredients in the presence of water.

| | Parts by weight |
|---|---|
| Sodium aluminate | 15–28 |
| Alumina | 2–5 |
| Fluorspar | 35–65 |
| 40% ferro-titanium | 10–30 |
| Limestone | 0–30 |

The paste was applied by extrusion to a welding rod core consisting of an 18:8 austenitic chromium nickel steel and the coated electrode was dried by baking.

*Example 2*

A paste-like coating composition was prepared by mixing the following ingredients in the presence of water.

| | Parts by weight |
|---|---|
| Titanium oxide pigment | 3–6 |
| Rutile | 30–55 |
| Limestone | 8–18 |
| Mica | 8–15 |
| Magnesite | 8–18 |
| Sodium aluminate | 15–25 |

The paste was applied by extrusion to a mild steel core and the coated electrode was dried by baking.

In the production of coated welding rods designed to give a deep penetration it has been proposed to form the coating by dipping the welding rod in an aqueous medium containing an alkaline earth metal carbonate, a binding agent consisting of dextrine or like substance capable of producing large quantities of carbonaceous gases, and a substance which will carry the materials of the coating into the fusion zone and which is preferably sodium bicarbonate but which may be an alkali metal metallate such as sodium aluminate. The present invention however is concerned with flux-coated welding rods in which sodium or potassium aluminate is employed as binding agent and we make no claim herein to flux-coated welding rods in which the coating contains an organic binding agent.

I claim:

1. In a coating material for an electrode comprising powdered minerals as coating ingredients, the combination therewith as a binder for said coating ingredients of an alkali metal aluminate having a molecular ratio of alkali metal oxide to aluminum oxide in excess of one, and a metal oxide combinable with said excess alkali metal oxide, the amount of said alkali metal aluminate being sufficient to enable the same to bind said coating ingredients, and the amount of said metal oxide being sufficient to combine with said excess alkali metal oxide, said metal oxide being selected from the class consisting of the oxides of aluminum, titanium and zirconium, said alkali metal being selected from the class consisting of sodium and potassium.

2. In an electrode coating material comprising powdered mineral or other substances customarily used with a sodium silicate binder, a binder consisting of a deliquescent alkali metal aluminate having a molecular ratio of alkali metal oxide to aluminum oxide in excess of one, and a metal oxide combinable with the excess alkali metal oxide of said aluminate, the amount of said metal oxide being sufficient to combine with said excess alkali metal oxide to render the alkali metal aluminate non-deliquescent, said metal oxide being selected from the class consisting of the oxides of aluminum, titanium, and zirconium, said alkali metal aluminate being selected from the class consisting of sodium aluminate and potassium aluminate, and the amount of said aluminate being 15 to 28 parts by weight of a total of 62 to 158 parts by weight of the combined binder and coating material when the aluminate is sodium aluminate, and the amount of said aluminate when the latter is potassium aluminate being equivalent to the said amount of said sodium aluminate.

3. In a coating material for an electrode comprising powdered minerals as coating ingredients, the combination therewith as a binder for said coating ingredients of a deliquescent alkali metal aluminate having a molecular ratio of alkali metal oxide to aluminum oxide of about 1.3 to 1.0, and a metal oxide combinable with the excess alkali metal oxide of said aluminate, the amount of said metal oxide being sufficient to combine with said excess alkali metal oxide to render the alkali metal aluminate non-deliquescent, said metal oxide being selected from the class consisting of the oxides of aluminum, titanium, and zirconium, said alkali metal aluminate being selected from the class consisting of sodium aluminate and potassium aluminate, and the amount of said aluminate being 15 to 28 parts by weight of a total of 62 to 158 parts by weight of the combined binder and coating material when the aluminate is sodium aluminate, and the amount of said aluminate when the latter is potassium aluminate being equivalent to the said amount of said sodium aluminate.

4. In an electrode coating material comprising powdered mineral or other substances customarily used with a sodium silicate binder, the combination therewith as a binder to replace sodium silicate of a deliquescent alkali metal aluminate having a molecular ratio of alkali metal oxide to aluminum oxide of about 1.3 to 1.0, and a metal oxide combinable with the excess alkali metal oxide of said aluminate, the amount of said metal oxide being sufficient to combine with said excess alkali metal oxide to render the alkali metal aluminate non-deliquescent, said metal oxide being selected from the class consisting of the oxides of aluminum, titanium, and zirconium, said alkali metal aluminate being selected from the class consisting of sodium aluminate and potassium aluminate, and the amount of said aluminate being 15 to 28 parts by weight of a total of 62 to 158 parts by weight of the combined binder and coating material when the aluminate is sodium aluminate, and the amount of said aluminate when the latter is potassium aluminate being equivalent to the said amount of said sodium aluminate.

5. In a coating material for an electrode comprising powdered minerals as coating ingredients, the combination therewith as a binder for said coating ingredients of deliquescent sodium aluminate having a molecular ratio of sodium oxide to aluminum oxide of about 1.3 to 1.0, and titanium oxide pigment combinable with the excess sodium oxide to render the sodium aluminate non-deliquescent, the amount of said titanium oxide pigment in the binder being 3 to 6 parts by weight of the coating material, and the amount of said aluminate being 15 to 25 parts by weight of a total of 72 to 137 parts by weight of the combined binder and coating material.

6. In a coating material for an electrode comprising powdered minerals as coating ingredients, the combination therewith as a binder for said coating ingredients of deliquescent sodium aluminate having a molecular ratio of sodium oxide to aluminum oxide of about 1.3 to 1.0, and alumina combinable with the excess sodium oxide to render the sodium aluminate non-deliquescent, the amount of said alumina being 2 to 5 parts by weight of the coating material, and the amount of said aluminate being 15 to 28 parts by weight of a total of 62 to 158 parts by weight of the combined binder and coating material.

7. The combination as defined in claim 3 in which the metal oxide is aluminum oxide.

8. The combination as defined in claim 3 in which the metal oxide is titanium oxide.

9. The combination as defined in claim 3 in which the metal oxide is zirconium oxide.

10. The combination as defined in claim 3 in which the alkali metal aluminate is sodium aluminate.

11. The combination as defined in claim 3 in which the alkali metal aluminate is potassium aluminate.

12. The combination as defined in claim 4 in which the metal oxide is aluminum oxide.

13. The combination as defined in claim 4 in which the metal oxide is titanium oxide.

14. The combination as defined in claim 4 in which the metal oxide is zirconium oxide.

15. The combination as defined in claim 4 in which the alkali metal aluminate is sodium aluminate.

16. The combination as defined in claim 4 in which the alkali metal aluminate is potassium aluminate.

WILLIAM ANDREWS.

REFERENCES CITED

The following references are of record in the file of this patent:

UNITED STATES PATENTS

| Number | Name | Date |
|---|---|---|
| Re. 20,102 | Miller | Sept. 8, 1936 |
| 1,374,711 | Armor | Apr. 12, 1921 |
| 1,534,240 | Newberry | Apr. 21, 1925 |
| 1,663,004 | Green | Mar. 20, 1928 |
| 1,965,555 | Miller | July 3, 1934 |
| 2,396,246 | Callis | Mar. 12, 1946 |

FOREIGN PATENTS

| Number | Country | Date |
|---|---|---|
| 553,170 | Great Britain | May 11, 1943 |
| 578,446 | Great Britain | June 28, 1945 |